M. JOHNSON.
Improvement in Potato Diggers.
No. 132,364.  Patented Oct. 22, 1872.
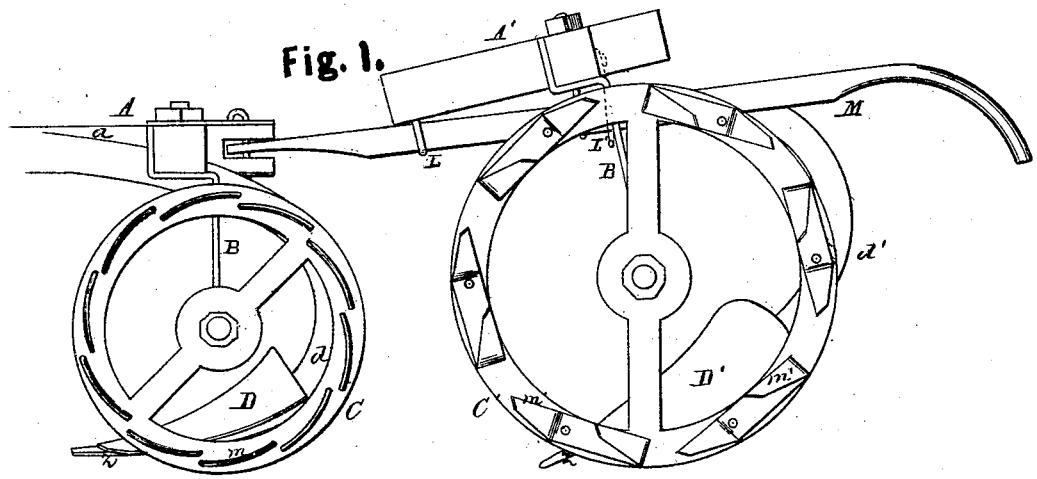
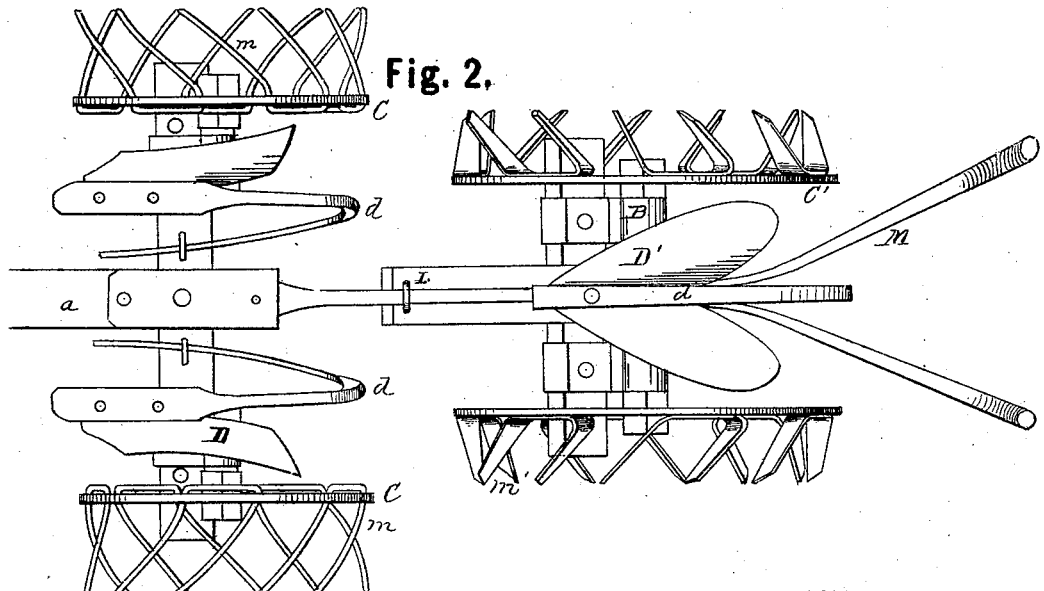
WITNESSES.
A. B. Kane
Geo. E. Upham
INVENTOR.
Moses Johnson
Chipman Hosmer & Co.
Attys

UNITED STATES PATENT OFFICE.

MOSES JOHNSON, OF THREE RIVERS, MICHIGAN, ASSIGNOR OF ONE-HALF HIS RIGHT TO EDWIN LANTY, OF SAME PLACE.

IMPROVEMENT IN POTATO-DIGGERS.

Specification forming part of Letters Patent No. 132,364, dated October 22, 1872.

*To all whom it may concern:*

Be it known that I, MOSES JOHNSON, of Three Rivers, in the county of St. Joseph and State of Michigan, have invented a new and valuable Improvement in Potato-Diggers; and I do hereby declare that the following is a full, clear, and exact description of the construction and operation of the same, reference being had to the annexed drawing making a part of this specification, and to the letters and figures of reference marked thereon.

Figure 1 of the drawing is a representation a side view of my invention. Fig. 2 is a bottom view of the same.

This invention has relation to a potato-digger mounted on wheels, which are armed with sifting-fingers to toss the potatoes and free them from the earth; and consists in the construction and novel arrangement of the frames with the sifting-wheels and plows for opening the potato-hills, all substantially as and for the purpose hereinafter specifically described.

Referring to the accompanying drawing, A A' designate, respectively, the forward and rear sections of the frame, made each in the form of a cross, as shown. To the transverse beam of each section is secured the bent standards B, holding at their lower ends the axle-arms, upon which are placed the sifting-wheels C C'. Between the wheels C are arranged the small single-winged plows D, inclined toward said wheels, and secured to the curved beams $d$, which being attached to the longitudinal beam $a$, thence diverge and extend back and around, as shown. Between the wheels C' is located the double-winged plow D', secured to a beam, $d'$, which is curved backward and upward, and extends forward to the rear end of the beam $a$, and is pivoted within a slot cut therein. This beam $d'$ is used to couple the two sections of the frame together. By removing the coupling-pin the two sections may be separated, each capable of being used as a potato-digger. As the plows pass between the hills the earth is thrown out toward the sifting-fingers and is by them so lightly scattered as to not injure the plants in the least. By reversing the plows the earth may be thrown inwardly toward the central hill. The plow-beams, it will be perceived, project forward of and constitute the plow points, preserving the ends of the shovels from being worn. The points of said beams are shouldered at $z$, to render the shovels firm in their positions. The rear shovel is notched at its point to receive the shoulder of its beam, and prevent lateral displacement of the former. Loops L depending from the hind section of the frame support the beam $d'$. A pivoted hook, L', is employed to support the beam when raised in going to and from the field. M designates handles, secured to and diverging from the beam $d'$. The wheels C C' are each constructed with only two spokes, in order to allow the contents of the potato-hills to pass through easily to the sifting-fingers, and to prevent clogging by vines or weeds. The wheels are armed with the oblique sifting-fingers projecting from the rims toward the outside. The fingers marked $m$ are formed from round rods bent to the form of the letter U, the fingers passed through holes in the rims of the wheels C from the inside and bent back obliquely on the outside, as shown. The fingers $m$ are thus very easily arranged, and may be secured by being properly bent, and without the aid of bolts or other fastenings. The fingers $m'$ are made from narrow strips bent to the proper form, as shown in the drawing, and riveted or bolted to the rim of the wheels C'. These fingers are slightly beveled, so as to enter the earth gradually. These fingers are strong and light. They cut into the earth easily, and the strain comes on them edgewise and is fully resisted.

In digging potatoes the front plows of the implement pass along the sides of the hill and throw the earth on the wheel C. The hind plow follows and digs up the center of the hill, and throws the contents on the wheels C'. By means of the double arrangement of plows and wheels the work is rendered easier, and may be more thoroughly accomplished. The standards B of the section A are secured to the frame by bolts, which may be taken out and inserted in other holes, so as to vary the distance apart of the wheels C.

I claim as my invention—

The potato-digger, constructed in two separate sections, A A', the former provided with the single-winged plows D and sifting-wheels C, and latter provided with the double-winged plow D' and sifting-wheels C', substantially as specified.

In testimony that I claim the above I have hereunto subscribed my name in the presence of two witnesses.

MOSES JOHNSON.

Witnesses:
    R. R. PEALER,
    JOHN I. MAJOR.